US006934686B1

(12) United States Patent
Rajagopalan

(10) Patent No.: US 6,934,686 B1
(45) Date of Patent: Aug. 23, 2005

(54) WARRANTY TRANSACTION SYSTEM AND METHOD

(75) Inventor: Arjun Rajagopalan, Carrollton, TX (US)

(73) Assignee: i2 Technologies US, Inc., Dallas, TX (US)

( * ) Notice: Subject to any disclaimer, the term of this patent is extended or adjusted under 35 U.S.C. 154(b) by 402 days.

(21) Appl. No.: 09/608,792

(22) Filed: Jun. 30, 2000

(51) Int. Cl.$^7$ ............................................. G06F 17/60
(52) U.S. Cl. ................................ 705/1; 705/26; 705/4
(58) Field of Search ..................................... 705/1, 26, 4

(56) References Cited

U.S. PATENT DOCUMENTS

| | | | | |
|---|---|---|---|---|
| 5,940,812 | A | | 8/1999 | Tengel et al. ................... 705/38 |
| 5,987,434 | A | | 11/1999 | Libman ........................ 705/36 |
| 6,141,653 | A | * | 10/2000 | Conklin et al. |
| 6,272,528 | B1 | | 8/2001 | Cullen et al. ................ 709/202 |
| 6,453,306 | B1 | * | 9/2002 | Quelene |
| 2001/0014868 | A1 | * | 8/2001 | Herz et al. ..................... 705/14 |
| 2001/0051884 | A1 | * | 12/2001 | Wallis et al. .................... 705/4 |

FOREIGN PATENT DOCUMENTS

JP 08044953 A * 2/1996 ............ G07G/1/12

OTHER PUBLICATIONS

Information on HomeGain.com. Inc., 1999.*
Information on Realtor.com, 1998–1999.*
Information on Warranty Gold Ltd., 1996–2001.*
Stewart McKie, "Getting A Grip On IT Assets", Jun. 1999, Business Financing Mag.*
I. Whitworth, Heather Picinich, "Application Software", Jun. 1, 1998, © US & Foreign Commerical Service And US Department Of State.*
Information on Warranty Direct, 1998–2000.*
Information on Lending Tree, Inc., 1999–2000.*
Information on HomeGain.Com. 1999.*
Information on HomeGain.com, 1999–2000, printed through www.archive.org.*
Information on CarFax, Inc., 1999–2000, printed through www.archive.org.*

(Continued)

*Primary Examiner*—John G. Weiss
*Assistant Examiner*—Naresh Vig
(74) *Attorney, Agent, or Firm*—James E. Walton; Brian E. Harris

(57) ABSTRACT

A warranty transaction system (30) includes a user interface (32) that receives a warranty request from a customer computer (20) using a communications network (12). The warranty request indicates an item a customer desires to cover under a warranty. The warranty transaction system (30) also includes a warranty generation engine (34) that generates one or more warranty packages that are consistent with the warranty request. The warranty packages are created according to one or more rules. The user interface (32) communicates the warranty packages to the customer computer (20), receives a selection of at least one warranty package from the customer computer (20), and communicates the selected warranty package to one or more warranty provider computers (40) using the communications network (12). In a more particular embodiment, the user interface (32) receives bids on the selected warranty package from one or more warranty provider computers (40) and communicates the bids to the customer computer (20). The user interface (32) receives an acceptance of a bid from the customer computer (20) and communicates the acceptance to the warranty provider computer (40) that communicated the accepted bid.

27 Claims, 2 Drawing Sheets

OTHER PUBLICATIONS

BrickBoard Archives, May 2001.*

Warranty Superstore.com Teams With CoolSavings to Offer Consumers "Cool" Savings Warranty Superstore.com will Receive Customized Savings Opprotunities, Mar. 23, 2000, Business Wire.*

European Firms Happy With PC Industry, Oct. 11, 1995, Newsbytes News Network.*

Unknown, Business Wire, "ebix.com Becomes Exclusive Insurance Provider to Leading Vehicle Warranty Site; ebix Insurance Center Goes Live Today On 1SourceWarranty.com," World, Reporter, 2 pages, May 24, 2000.

Unknown, Insurance Networking, InsWeb builds its Brand Image (Online insurance sales may total $4+ bil by 2003; InsWeb launches an initial public offering with Softbank Group acquiring 27%). 7 pages, Oct. 1999.

Notification of Transmittal of the International Search Report or the Declaration, 4 pages, Sep. 19, 2001.

* cited by examiner

WARRANTY TRANSACTION SYSTEM AND METHOD

BACKGROUND OF THE INVENTION

When a customer wishes to obtain a warranty on an item that the customer currently owns or is planning to purchase, the customer typically has limited options regarding the features and price of the warranty. For example, if a customer wishes to buy an extended warranty to cover the customer's automobile after the manufacturer's warranty expires, the customer is often limited to an extended warranty option offered by the manufacturer or a retailer. The coverage of the offered warranty may be too broad or too narrow, or the price of the warranty may be too high, to meet the customer's particular needs. However, the customer typically does not have the option to customize the warranty or to bargain over the price of the warranty to meet these needs. These problems are exacerbated further when the warranty the customer seeks is not a type of warranty that is typically provided by the manufacturer or retailer.

SUMMARY OF THE INVENTION

According to the present invention, disadvantages and problems associated with previous warranty transactions have been substantially reduced or eliminated.

According to one embodiment of the present invention, a warranty transaction system includes a user interface that receives a warranty request from a customer computer using a communications network. The warranty request indicates an item that a customer desires to cover under a warranty. The warranty transaction system also includes a warranty generation engine that generates one or more warranty packages that are consistent with the warranty request. The warranty packages are created according to one or more rules. The user interface communicates the warranty packages to the customer computer, receives a selection of at least one warranty package from the customer computer, and communicates the selected warranty package to one or more warranty provider computers using the communications network. In a more particular embodiment, the user interface receives bids on the selected warranty package from one or more warranty provider computers and communicates the bids to the customer computer. The user interface receives an acceptance of a bid from the customer computer and communicates the acceptance to the warranty provider computer that communicated the accepted bid.

The warranty transaction system and method of the present invention provide a number of important technical advantages. The present invention provides a customer with one or more customized warranty package options based on information provided by the customer and based on information gathered by the system. The warranty package options are generated according to a set of rules that tailor the warranty packages to the customer's particular needs. The invention allows the customer to select one or more of the warranty package options and to communicate that selection to one or more warranty providers. The warranty providers are given the ability to bid on the selected warranty package, and the customer can then choose one or more of the bids. Therefore, unlike previous warranty transaction scenarios, the present invention provides the customer with a warranty tailored to the customer's specific needs and allows the customer to purchase the warranty at a competitive price. Other important technical advantages are readily apparent to those skilled in the art.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
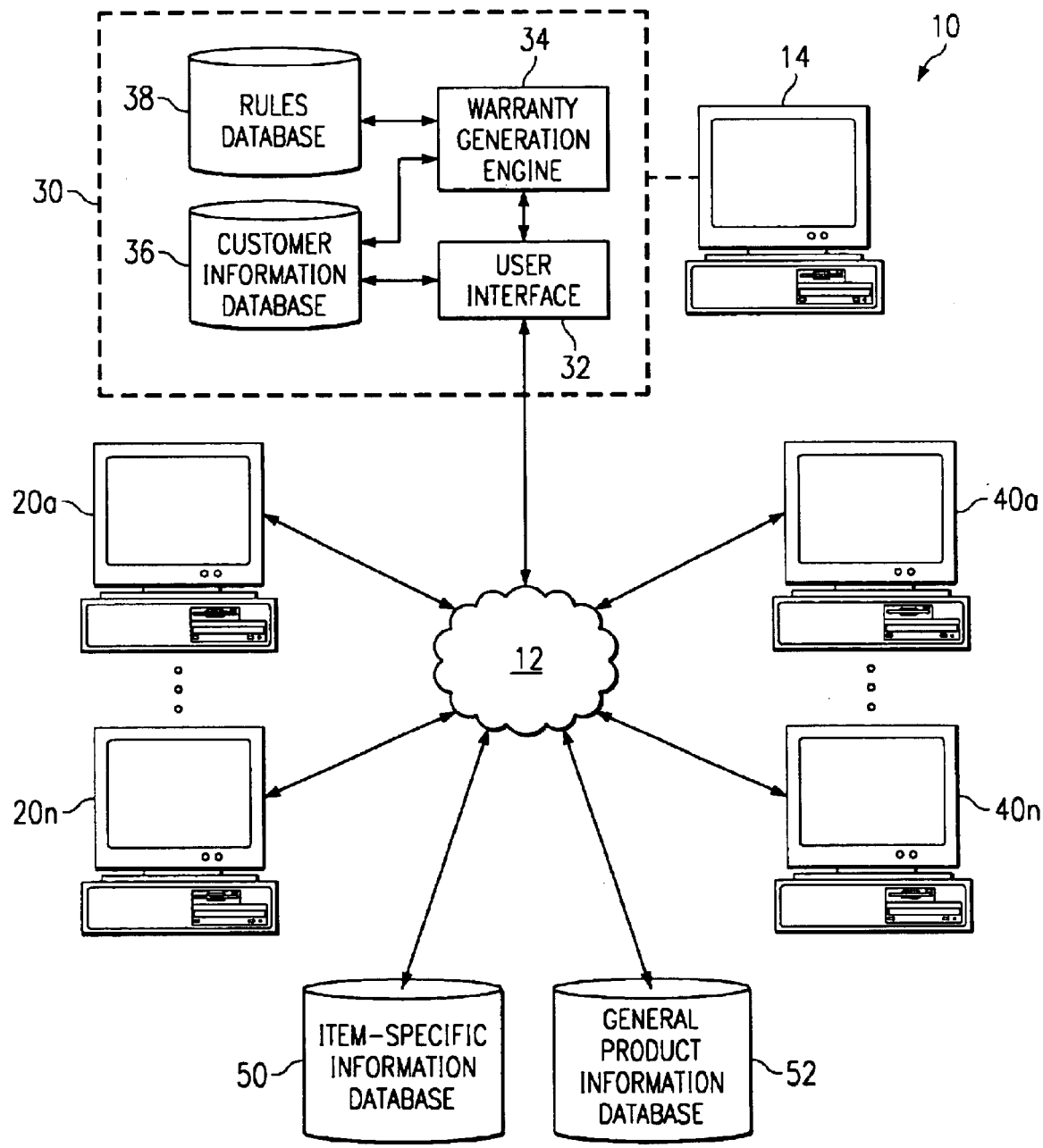
FIG. 1 illustrates an exemplary system for providing customized warranty package options to buyers and for linking the buyers to sellers to provide a marketplace for the buyers and sellers.

FIG. 1 illustrates an exemplary system for providing customized warranty package options to buyers (customers) and for linking the buyers to sellers (warranty providers) to provide a marketplace for the buyers and sellers. In the illustrated embodiment, system 10 includes one or more customer computers 20a through 20n, a warranty transaction system 30, and one or more warranty provider computers 40a through 40n. Each customer and warranty provider using system 10 may have access to one or more customer computers 20 or warranty provider computers 40, respectively, at one or more locations. Customer computers 20 and warranty provider computers 40 may be desktop computers, laptop computers, personal digital assistants, digital telephones, or any other suitable computing or communications devices. Computers 20 and 40 may include input devices, output devices, processors, memory, and any other components suitable to manipulate information and execute instructions according to the operation of system 10.

Customer computers 20, warranty transaction system 30, and warranty provider computers 40 communicate with one another using a network 12. In a particular embodiment, network 12 includes a global computer network such as the Internet. Network 12 may, however, include any suitable wired or wireless system that supports communications between customer computers 20 and warranty provider computers 40. For example, network 12 may include one or more public switched telephone networks (PSTN), integrated services digital networks (ISDN), local area networks (LAN), metropolitan area networks (MAN), wide area networks (WAN), or other communication systems or combination of communication systems at one or more locations. Computers 20 and 40 may include interfaces, web browsers, or any other hardware, software or other components to facilitate connection to network 12 and interaction with other network devices.

In the exemplary embodiment, warranty transaction system 30 includes a user interface 32, a warranty generation engine 34, a customer information database 36, and a rules database 38, which may be integral to or separate from one another. These components of warranty transaction system 30 may operate on one or more computers 14 at one or more locations. Computer 14 may include fixed or removable storage media, such as magnetic computer disks, CD-ROM, or other suitable media to store software associated with warranty transaction system 30 and to receive output from and provide input to warranty transaction system 30. Computer 14 may include a processor and volatile or non-volatile memory to execute instructions and manipulate information according to the operation of warranty transaction system 30. Although only a single computer 14 is shown, the components of system 30 may each operate on separate computers 14, or may operate on one or more shared computers 14, without departing from the intended scope of the present invention.

User interface 32 provides an access point through which a user of system 30, such as a customer or a warranty provider, may input information to and receive information from warranty transaction system 30. In a particular embodiment, user interface 32 includes a web server supporting one or more pages, files, or other data structures such as hypertext markup language (HTML) or extensible markup language (XML) pages, that may be communicated to a customer computer 20 or a warranty provider computer 40 and conveyed using a web browser running on computer 20 or 40. User interface 32 may also include an e-mail server operable to send messages to and receive messages from computers 20 and 40. Although user interface 32 is described as operating on computer 14 within warranty transaction system 30, the present invention contemplates user interface 32 operating in part in association with one or more customer computers 20 and one or more warranty provider computers 40, as appropriate.

In one aspect of operation, a customer uses customer computer 20 to communicate information to warranty transaction system 30 regarding an item or items that the customer wants to have covered under a warranty and the desired characteristics of the warranty. This communication from a customer may be referred to as a warranty request. Warranty transaction system 30 receives the warranty request from the customer computer 20 using user interface 32. As described above, user interface 32 may include a web server providing one or more web pages to customer computer 20. These web pages may prompt the user to enter information relating to desired warranty or warranties. This information may include information associated with the item to be covered by the warranty. The information may also include the desired warranty characteristics such as the location of the warranty provider, the size of the warranty provider, the term of the warranty, a maximum price or desired price range of the warranty, the transferability of the warranty, the deadline by which the warranty provider must respond, or any other appropriate characteristics of the desired warranty. The entered information may then be stored in customer information database 36.

Warranty transaction system 30 may also obtain information related to the item to be covered from one or more customer-specific information databases 50 and one or more general product information databases 52, which are coupled to network 12 or otherwise accessible by warranty transaction system 30. Customer-specific information database 50 contains information concerning the particular item, such as an automobile, that the customer wishes to place under warranty. Although the term "customer-specific" is used, it should be understood that the information in customer-specific information database 50 may include information related to the item even though this information may relate to a time when the item was owned by a person other than the customer requesting the warranty. For example, customer-specific database 50 may include a repair history of an automobile to be covered even though some of the repairs may have been made when the automobile was owned by another person.

General product information database 52 contains information concerning one or more particular product or item types, such as the make and model of the automobile owned by the customer. Although a single customer-specific information database 50 and a single general product information database 52 are illustrated, multiple databases 50 and 52 may be coupled to network 12 and accessed by warranty transaction system 30. For example, a separate database 50 may exist for each automobile retailer associated with warranty transaction system 30, and a separate database 52 may exist for each manufacturer associated with system 30. The information in databases 50 and 52 may be retrieved by warranty transaction system 30 after a customer has communicated a warranty request to warranty transaction system 30, or the information may be stored and compiled in warranty transaction system 30 (for example, in a database associated with computer 14) before the warranty request is received. In the latter case, the information may then be accessed locally by computer 14 when desired.

Information obtained from customer computer 20 and databases 50 and 52 is communicated to warranty generation engine 34. Warranty generation engine 34 generates one or more warranty packages consistent with the warranty requested by the customer. Each warranty package may include one or more warranties that cover all or part of the item included in the warranty request. Warranty generation engine 34 may specifically recommend one or more of these warranty packages based on the customer input, the information obtained from databases 50 and 52, or any other appropriate information that warranty generation engine 34 may obtain or have stored. Warranty generation engine 34 generates the warranty packages according to a set of rules stored in rules database 38. For example, an exemplary rule may specify that if a portion of the covered item, such as a particular part an automobile, has been replaced within the last year, then a warranty package including a warranty for that part should not be generated or should be generated but not recommended. The rules in rules database 38 may be updated based on information received from one or more warranty providers, from the customer, from databases 50 and 52, or from any other appropriate source.

Once the warranty packages have been generated, the warranty packages are communicated to the customer. The customer selects one or more of the packages using user interface 32. This selection may be stored in customer information database 36. The selected warranty package and information relating to the customer (information entered by the customer or obtained from any other source, including databases 50 and 52) is then communicated to one or more warranty provider computers 40 using network 12. This communication may be in the form of an e-mail message sent to the warranty provider computers 40, web page content communicated to the warranty provider computers 40, or any other appropriate form of communication. The warranty providers associated with the warranty provider computers 40 to which the customer selection and information was communicated may then respond with a bid on one or more of the warranties included in the selected warranty package. The bid may include the type of warranty being offered, the characteristics of the warranty, the price of the warranty, and any other appropriate information. The providers may communicate the bid directly to customer computer 20 or to warranty transaction system 30 for distribution to the customer.

Once the customer receives the bids from the warranty providers, the customer may accept one or more of the warranty bids. The customer's acceptance may be communicated directly from customer computer 20 to warranty provider computer(s) 40. Alternatively, the customer's acceptance may be communicated to warranty transaction system 30, which may then notify each bidding warranty provider whether their bid has been accepted. Customer information may be communicated to warranty provider computers 40 to allow the customer and warranty provider to communicate regarding the warranty offered by the warranty provider and to allow the parties to form a contractual agreement either electronically, telephonically, personally, or in any other appropriate manner.

Therefore, the present invention provides a system that provides a customer with one or more warranty package options based on information provided by the customer and based on information gathered by the system. The system allows the customer to select a warranty package from among the warranty package options, and the system then communicates the warranty package selection to one or more warranty providers. The warranty providers are provided the ability to bid on the selected warranty package, and the customer can choose one or more of the bids. Accordingly, the present invention provides the customer with a warranty tailored to the customer's specific needs and allows the customer to purchase the warranty at a competitive price, providing an important technical advantage.

Figure 2:
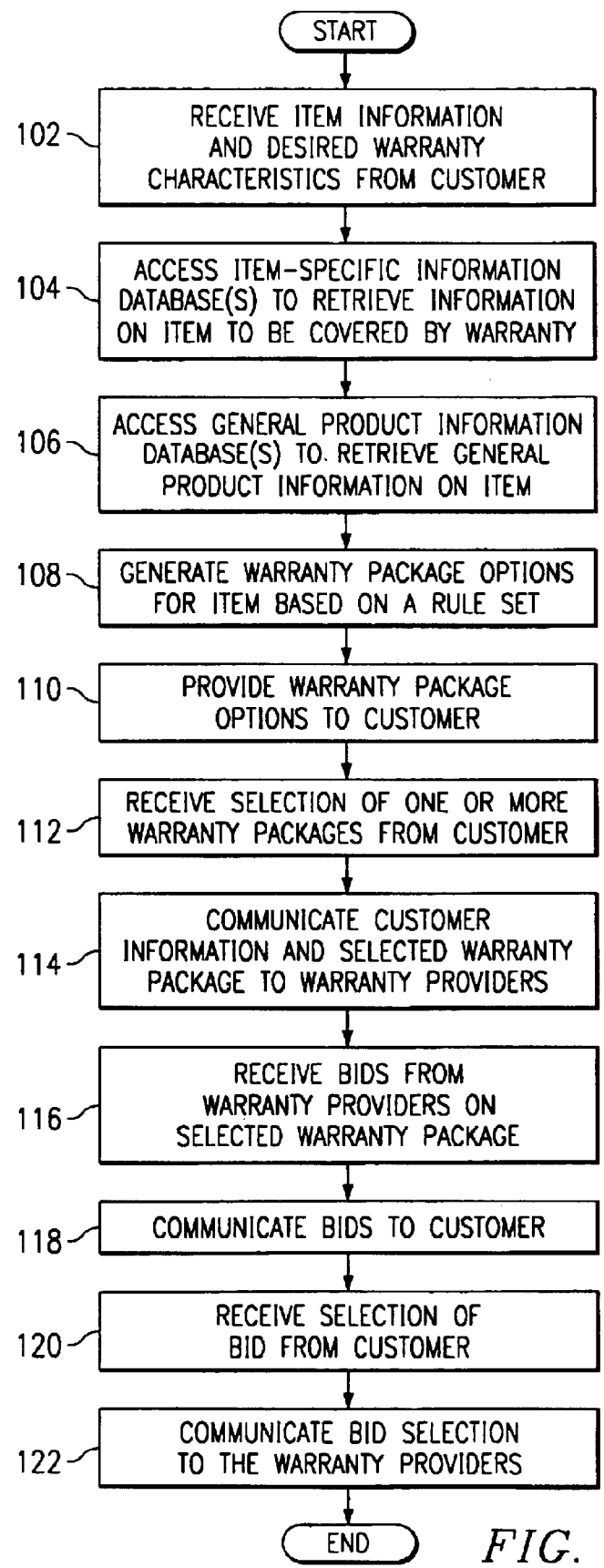
FIG. 2 illustrates an exemplary method for enabling a warranty transaction.

FIG. 2 illustrates an exemplary method for enabling a warranty transaction according to aspects of the present invention. The method begins at step 102, where warranty transaction system 30 receives a warranty request from a customer computer 20. As an example, and not by way of limitation, the following description assumes that the customer using customer computer 20 requests a warranty to cover an automobile owned by the customer. The present invention may be used to facilitate warranty transactions for any other appropriate item, and the examples given below relating to automobiles are for exemplary purposes only and should not be construed to limit the scope of the present invention.

The exemplary warranty request for the automobile includes information about the item to be covered (the automobile) and the desired warranty characteristics. The customer-specific information communicated to warranty transaction system 30 may include the make, model, year, license plate number, vehicle identification number (VIN), or any other appropriate information associated with the automobile to be covered by the warranty. The warranty characteristics communicated by the customer may include the location of the warranty provider, the size of the warranty provider, the term of the warranty, a maximum price or desired price range of the warranty, the transferability of the warranty, the deadline by which the warranty provider must respond, or any other appropriate characteristics of the desired warranty. As described above, this item and warranty characteristic information may be received from customer computer 20 using user interface 32. User interface 32 may store this information in customer information database 36.

At step 104, warranty transaction system 30 gathers additional information regarding the customer's automobile from one or more customer-specific information databases 50. In the exemplary embodiment, warranty transaction system 30 may use the license plate numbers, VIN, or other identifier associated with the customer's automobile that were provided by the customer to access databases 50 that include specific information about the customer's automobile. For example, warranty transaction system 30 may access the database 50 of an automobile manufacturer or retailer that has serviced the customer's automobile to obtain the maintenance history of the automobile. This history may include information about the parts that have been replaced and the date and mileage at which the parts were replaced. Warranty transaction system 30 may also access an insurer's database 50 to determine whether any damage has been inflicted on the automobile. This information may be obtained directly from databases 50 that are coupled to network 12, or may be input to warranty transaction system 30 from another source. One or more other appropriate databases 50 may be accessed instead of or in addition to the exemplary databases 50 described above to obtain customer-specific information.

At step 106, warranty transaction system 30 may gather information from one or more general product information databases 52. Databases 52 may include general information about the make, model, trim line, year, or any other information concerning the automobile that the customer wishes to cover, in any suitable combination. For example, warranty transaction system 30 may access a database 52 that includes information about the general reliability of the make, model, trim line, and year of the automobile or about the reliability of specific parts of the automobile. More specifically, as merely an example, warranty transaction system 30 may access a database 52 that indicates the transmission on the particular make, model, trim line, and year of the automobile has an average lifespan of one hundred thousand miles. As with customer-specific information databases 50, general product information databases 52 may be coupled to network 12 and directly accessed by warranty transaction system 30, or the information in databases 52 may be otherwise input to warranty transaction system 30. In addition, any other appropriate databases 52 may be accessed to obtain general product information relating to the item to be covered under the warranty.

Using the information provided by the customer and any information gathered from customer-specific information databases 50 or general product information databases 52, warranty generation engine 34 generates one or more warranty package options for the customer's automobile at step 108. The warranty packages are generated according to one or more rules stored in rules database 38. These rules determine the characteristics of the warranty packages that are generated. For example, and not by way of limitation, an exemplary rule may indicate that if the customer has had a specific part replaced in the automobile within the past ten thousand miles or within a certain period of time, then warranty generation engine 34 should not generate or should not recommend a warranty on that particular part. Another exemplary rule might indicate that if the car has been driven more than 50,000 miles, then a warranty on the water pump should not be generated. The information on the repair history of the car and the mileage of the car used in these rules may be obtained from the customer or from databases 50 or 52. Any other appropriate rules may be used, including rules that incorporate information received from the customer and from databases 50 and 52, in order to generate a warranty package or packages that are tailored to meet the specific needs of the customer. Using these rules, warranty generation engine 34 may generate an assortment of warranty packages that cover individual parts of the customer's automobile or that cover the entire automobile.

Warranty generation engine 34 provides the generated warranty packages to user interface 32, which then communicates the warranty packages to customer computer 20 at step 110. This communication may be made using any appropriate method of communication over network 12, including sending an e-mail or communicating one or more web pages. The customer using customer computer 20 selects one or more of the warranty package options and communicates this selection to warranty transaction system 30 using an e-mail message, a web page, or any other appropriate method. Warranty transaction system 30 receives the selection of the customer at step 112.

Warranty transaction system 30 communicates the selected warranty package or packages to one or more warranty provider computers 40 at step 114. This communication may be made using any appropriate form of communication over network 12, including sending an e-mail or communicating one or more web pages. Warranty transaction system 30 may also send selected information associated with the customer (information entered by the customer or obtained from any other source, including databases 50 and 52) to warranty provider computers 40 to enable the warranty providers to make an informed decision regarding a bid on the selected warranty package. For example, the warranty provider might wish to know the mileage or repair history for an automobile before bidding on a warranty package. Based on the communicated information, one or more warranty providers may determine a bid on some or all of each warranty package selected by the customer. For example, if the selected warranty package includes a warranty for all parts of the customer's automobile, some warranty providers might bid on warranties that cover only certain parts of the automobile, such as the transmission. Warranty provider computers 40 may communicate the bids of the warranty providers to warranty transaction system 30 using network 12 at step 116. Warranty transaction system 30 communicates the bids to customer computer 20 at step 118. Alternatively, warranty providers may communicate their bids directly to customer computers 20 using network 12.

As described above, the bids communicated from the warranty providers include the features and coverage of the warranty offered by the provider and the price at which the warranty is offered. Based on these bids, the customer using customer computer 20 accepts one or more of the warranty packages. The customer may then communicate the selection to warranty transaction system 30 at step 120 using network 12. Warranty transaction system 30 then communicates the selection of the customer to warranty provider computers 40 at step 122. Alternatively, the customer may communicate the selection directly to the warranty provider using network 12. Warranty transaction system 30 may notify all warranty providers of the customer's selection, possibly including warranty providers whose bids were not selected. The provider whose bid was selected may communicate with the customer to set up the warranty, using network 12 or otherwise. Warranty transaction system 30 may act as an intermediary in the formation of the contract between the customer and the selected warranty provider(s), or the customer and warranty provider may communicate directly.

An advantage of using warranty transaction system 30 is that warranty providers may obtain detailed information about the customer and the item that is to be covered by the warranty. The warranty provider can then use this information to tailor its bid to the customer and to more efficiently provide service to the customer after the warranty is accepted by the customer. For example, based on the coverage of an automobile warranty being provided and the age of covered parts in a customer's automobile, the warranty provider providing the warranty may inform an associated repair facility to keep one or more covered parts in inventory to meet possible short-term needs of the customer. This may be particularly desirable where the warranty provider deals with a large number of customers. In addition, any other appropriate type of business planning and supply chain management may also be performed using the information provided by the customer or otherwise obtained by warranty transaction system 30.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented method for enabling a warranty transaction, comprising:

receiving a warranty request from a customer computer:

the warranty request specifying a particular item that a customer desires to cover under a warranty;

the warranty request comprising an identification of the particular item and desired warranty coverage characteristics of the warranty under which the particular item is to be covered; and the warranty request enabling:

(i) access to, from one or more sources other than the warranty request, historical data for the particular item based on the warranty request;

(ii) generation of a plurality of warranty packages for the particular item, each specific to the warranty request, based on one or more rules each associating historical data for generic items with one or more warranty coverage characteristics for generic items; and (iii) communication of a customer-selected one of the plurality of request-specific warranty packages generated for the particular item for bidding on the customer-selected one of the plurality of request-specific warranty packages generated for the particular item based on the warranty request;

in response to receiving the warranty request from the customer computer, accessing, from one or more sources other than the warranty request, historical data for the particular item based on the warranty request;

in response to accessing the historical data for the particular item, generating a plurality of warranty packages for the particular item, each specific to and comprising warranty coverage characteristics consistent with the warranty request, according to the historical data for the particular item and one or more rules each associating historical data for generic items with one or more warranty coverage characteristics for generic items;

in response to generating the plurality of request-specific warranty packages for the particular item, communicating the plurality of request-specific warranty packages generated for the particular item to the customer computer;

receiving a customer selection of at least one of the plurality of request-specific warranty packages generated for the particular item from the customer computer; and in response to receiving the customer selection of one of the plurality of request-specific warranty packages generated for the particular item, communicating the customer-selected one of the plurality of request-specific warranty packages generated for the particular item to one or more warranty provider computers for bidding on the customer-selected one of the plurality of request-specific warranty packages generated for the particular item.

2. The method of claim 1, wherein the particular item is currently associated with the customer and the method further comprises:

accessing one or more customer-specific information databases to obtain customer-specific information regarding the particular item, the historical data for the particular item comprising the customer-specific information; and using the information from the customer-specific information databases to generate the plurality of request-specific warranty packages for the particular item.

3. The method of claim 1, further comprising:

accessing one or more general product information databases to obtain general information regarding the type of item the customer desires to cover under the warranty, the particular item being of that type of item; and using the information from the general product information databases to generate the plurality of request-specific warranty packages for the particular item.

4. The method of claim 1, further comprising: storing customer information received from the customer computer; and using the customer information in generating the plurality of request-specific warranty packages for the particular item.

5. The method of claim 1, wherein communicating the plurality of request-specific warranty packages generated for the particular item to the customer computer comprises communicating pages to the customer computer using the Internet and displaying the pages using a browser executing at the customer computer.

6. The method of claim 1, wherein communicating the customer-selected one of the plurality of request-specific warranty packages generated for the particular item to one or more warranty provider computers comprises communicating pages to the warranty provider computers using the Internet and displaying the pages using a browser executing at the warranty provider computers.

7. The method of claim 1, wherein the particular item is a particular vehicle and the identification of the particular item comprises a vehicle identification number (VIN).

8. The method of claim 1, further comprising communicating information received from the customer computer to the warranty provider computers to assist warranty providers in generating bids on the customer-selected one of the plurality of request-specific warranty packages generated for the particular item.

9. The method of claim 1, further comprising:

receiving bids on the customer-selected one of the plurality of request-specific warranty packages generated for the particular item from one or more warranty provider computers;

communicating the bids to the customer computer;

receiving an acceptance of a particular bid from the customer computer; and communicating the acceptance of the particular bid to the warranty provider computer that communicated the accepted particular bid.

10. A computer-implemented warranty transaction system coupled to a communications network, comprising:

a user interface operable to receive a warranty request from a customer computer using the communications network:

the warranty request specifying a particular item that a customer desires to cover under a warranty;

the warranty request comprising an identification of the particular item and desired warranty coverage characteristics of the warranty under which the particular item is to be covered; and the warranty request enabling:

(i) access to, from one or more sources other than the warranty request, historical data for the particular item based on the warranty request;

(ii) generation of a plurality of warranty packages for the particular item, each specific to the warranty request, based on one or more rules each associating historical data for generic items with one or more warranty coverage characteristics for generic items; and (iii) communication of a customer-selected one of the plurality of request-specific warranty packages generated for the particular item for bidding on the customer-selected one of the plurality of request-specific warranty packages generated for the particular item;

a warranty generation engine operable to:

in response to the user interface receiving the warranty request from the customer computer, access from one or more sources other than the warranty request, historical data for the particular item; and in response to accessing the historical data for the particular item, generate a plurality of warranty packages for the particular item, each specific to and comprising warranty coverage characteristics consistent with the warranty request, according to the historical data for the particular item and one or more rules each associating historical data for generic items with one or more warranty coverage characteristics for generic items; and the user interface further operable to:

in response to generating the plurality of request-specific warranty packages for the particular item, communicate the plurality of request-specific warranty packages generated for the particular item to the customer computer;

receive a customer selection of at least one of the plurality of request-specific warranty packages generated for the particular item from the customer computer; and in response to receiving the customer selection of one of the plurality of request-specific warranty packages generated for the particular item, communicate the customer-selected one of the plurality of request-specific warranty packages generated for the particular item to one or more warranty provider computers using the communications network for bidding on the customer-selected one of the plurality of request-specific warranty packages generated for the particular item.

11. The system of claim 10, wherein the particular item is currently associated with the customer and the warranty generation engine is further operable to:

access one or more customer-specific information databases to obtain customer-specific information regarding the particular item, the historical data for the particular item comprising the customer-specific information; and use the information from the customer-specific information databases to generate the plurality of request-specific warranty packages for the particular item.

12. The system of claim 10, wherein the warranty generation engine is further operable to:

access one or more general product information databases to obtain general information regarding the type of item the customer desires to cover under the warranty, the particular item being of that type of item; and use the information from the general product information databases to generate the plurality of request-specific warranty packages for the particular item.

13. The system of claim 10, further comprising a customer information database coupled to the user interface and operable to store customer information received from the customer computer, the warranty generation engine operable to obtain customer information from the customer information database for use in generating the plurality of request-specific warranty packages for the particular item.

14. The system of claim 10, wherein the user interface comprises a web server operable to:
   communicate pages to the customer computer or to the one or more warranty provider computers for display using a browser executing at the customer computer or the one or more warranty provider computers, respectively; and
   receive information from the customer computer or the one or more warranty provider computers in response to the communicated pages.

15. The system of claim 10, wherein the particular item is a particular vehicle and the identification of the particular item comprises a vehicle identification number (VIN).

16. The system of claim 10, wherein the user interface is further operable to communicate information received from the customer computer to the warranty provider computers to assist warranty providers in generating bids on the customer-selected one of the plurality of request-specific warranty packages generated for the particular item.

17. The system of claim 10, wherein the user interface is further operable to:
   receive bids on the customer-selected one of the plurality of request-specific warranty packages generated for the particular item from one or more warranty provider computers;
   communicate the bids to the customer computer;
   receive an acceptance of a particular bid from the customer computer; and
   communicate the acceptance of the particular bid to the warranty provider computer that communicated the accepted particular bid.

18. Software for enabling an computer-implemented warranty transaction, the software being embodied in computer-readable media and when executed, operable to:
   receive a warranty request from a customer computer:
   the warranty request specifying a particular item that a customer desires to cover under a warranty;
   the warranty request comprising an identification of the particular item and desired warranty coverage characteristics of the warranty under which the particular item is to be covered; and
   the warranty request enabling:
   (i) access to, from one or more sources other than the warranty request, historical data for the particular item based on the warranty request;
   (ii) generation of a plurality of warranty packages for the particular item, each specific to the warranty request, based on one or more rules each associating historical data for generic items with one or more warranty coverage characteristics for generic items; and
   (iii) communication of a customer-selected one of the plurality of request-specific warranty packages generated for the particular item for bidding on the customer-selected one of the plurality of request-specific warranty packages generated for the particular item;
   in response to receiving the warranty request from the customer computer, access, from one or more sources other than the warranty request, historical data for the particular item;
   in response to accessing the historical data for the particular item, generate a plurality of warranty packages for the particular item, each specific to and comprising warranty coverage characteristics consistent with the warranty request, according to the historical data for the particular item and one or more rules each associating historical data for generic items with one or more warranty coverage characteristics for generic items;
   in response to generating the plurality of request-specific warranty packages for the particular item, communicate the plurality of request-specific warranty packages generated for the particular item to the customer computer;
   receive a customer selection of at least one of the plurality of request-specific warranty packages generated for the particular item from the customer computer; and
   in response to receiving the customer selection of the one of the plurality of request-specific warranty packages generated for the particular item, communicate the customer-selected one of the plurality of request-specific warranty packages generated for the particular item to one or more warranty provider computers for bidding on the customer-selected one of the plurality of request-specific warranty packages generated for the particular item.

19. The software of claim 18, wherein the particular item is currently associated with the customer and the software is further operable to:
   access one or more customer-specific information databases to obtain customer-specific information regarding the particular item, the historical data for the particular item comprising the custom-specific information; and
   use the information from the customer-specific information databases to generate the plurality of request-specific warranty packages for the particular item.

20. The software of claim 18, further operable to:
   access one or more general product information databases to obtain general information regarding the type of item the customer desires to cover under the warranty, the particular item being of that type of item; and
   use the information from the general product information databases to generate the plurality of request-specific warranty packages for the particular item.

21. The software of claim 18, further operable to:
   store customer information received from the customer computer; and use the customer information in generating the plurality of request-specific warranty packages for the particular item.

22. The software of claim 18, wherein being operable to communicate the plurality of request-specific warranty packages generated for the particular item to the customer computer comprises being operable to communicate pages to the customer computer using the Internet and display the pages using a browser executing at the customer computer.

23. The software of claim 18, wherein being operable to communicate the customer-selected one of the plurality of request specific warranty packages generated for the particular item to one or more warranty provider computers comprises being operable to communicate pages to the warranty provider computers using the Internet and display the pages using a browser executing at the warranty provider computers.

24. The software of claim 18, wherein the particular item is a particular vehicle and the identification of the particular item comprises a vehicle identification number (VIN).

25. The software of claim 18, further operable to communicate information received from the customer computer to the warranty provider computers to assist warranty providers in generating bids on the customer-selected one of the plurality of request-specific warranty packages generated for the particular item.

26. The software of claim 18, further operable to:

receive bids on the customer-selected one of the plurality of request-specific warranty packages generated for the particular item from one or more warranty provider computers;

communicate the bids to the customer computer;

receive an acceptance of a particular bid from the customer computer; and communicate the acceptance of the particular bid to the warranty provider computer that communicated the accepted particular bid.

27. A system for enabling an computer-implemented warranty transaction, comprising:

means for receiving a warranty request from a customer computer:

the warranty request specifying a particular item that a customer desires to cover under a warranty;

the warranty request comprising an identification of the particular item and desired warranty coverage characteristics of the warranty under which the particular item is to be covered; and the warranty request enabling:

(i) access to, from one or more sources other than the warranty request, historical data for the particular item based on the warranty request;

(ii) generation of a plurality of warranty packages for the particular item, each specific to the warranty request, based on one or more rules each associating historical data for generic items with one or more warranty coverage characteristics for generic items; and (iii) communication of a customer-selected one of the plurality of request-specific warranty packages generated for the particular item for bidding on the customer-selected one of the plurality of request-specific warranty packages generated for the particular item;

means for, in response to receiving the warranty request from the customer computer, accessing, from one or more sources other than the warranty request, historical data for the particular item based on the warranty request;

means for, in response to accessing the historical data for the particular item, generating, using a warranty generation engine, a plurality of warranty packages for the particular item, each specific to and comprising warranty coverage characteristics consistent with the warranty request, according to the historical data for the particular item and one or more rules each associating historical data for generic items with one or more warranty coverage characteristics for generic items;

means for, in response to generating the plurality of request-specific warranty packages for the particular item, communicating the plurality of request-specific warranty packages generated for the particular item to the customer computer;

means for receiving a customer selection of at least one of the plurality of request-specific warranty packages generated for the particular item from the customer computer; and means for, in response to receiving the customer selection one of the plurality of request-specific warranty packages generated for the particular item, communicating the customer-selected one of the plurality of request-specific warranty packages generated for the particular item to one or more warranty provider computers for bidding on the customer-selected one of the plurality of request-specific warranty packages generated for the particular item.

\* \* \* \* \*